United States Patent [19]

Moriyama

[11] 4,418,121

[45] Nov. 29, 1983

[54] TILE FOR CONSTRUCTION REPRESENTING ANTIQUE PATTERN

[76] Inventor: Kaneaki Moriyama, 24-2 Mukocho 1-chome, Amagasaki-shi, Hyogo, 661, Japan

[21] Appl. No.: 227,096

[22] PCT Filed: Jun. 23, 1979

[86] PCT No.: PCT/JP79/00163

§ 371 Date: Feb. 23, 1981

§ 102(e) Date: Jul. 10, 1980

[87] PCT Pub. No.: WO81/00015

PCT Pub. Date: Jan. 8, 1981

[51] Int. Cl.³ .................... C04B 41/02; E04F 13/14
[52] U.S. Cl. .................................... 428/409; 52/311; 125/23 R; 428/141; 428/195; 428/210; 428/913.3
[58] Field of Search ............ 125/23 R; 428/195, 210, 428/446, 454, 141, 409, 410, 540, 913.3; 52/311-316

[56] References Cited

U.S. PATENT DOCUMENTS

| | | | |
|---|---|---|---|
| 348,443 | 8/1886 | Anderson | 52/311 |
| 1,228,538 | 6/1917 | Dennison | 52/311 |
| 2,744,360 | 5/1956 | Collini | 52/311 |
| 3,140,704 | 7/1964 | Mangis | 125/23 R |

FOREIGN PATENT DOCUMENTS

| | | | |
|---|---|---|---|
| 1267004 | 6/1961 | France | 52/311 |
| 449772 | 6/1949 | Italy | 52/311 |

*Primary Examiner*—Bruce H. Hess
*Attorney, Agent, or Firm*—Wenderoth, Lind & Ponack

[57] ABSTRACT

There is provided a tile for construction representing antique patterns on the surface of refractory bricks cut in a suitable thickness and width using a diamond tool and obtained at the position exposed to the highest heat of a high temperature heating furnace as disposed in large quantity from enterprises as an industrial waste and as being troublesome in its disposing place and its cost to thereby sufficiently satisfy the desire of demand people who like the antique construction.

4 Claims, No Drawings

TILE FOR CONSTRUCTION REPRESENTING ANTIQUE PATTERN

DESCRIPTION

1. Technical Field

This invention relates to a tile for construction which is and more particularly to a construction tile obtained as an industrial waste from refractory bricks of a high heating furnace using heavy oil or coke through simple treatment.

2. Background Art

In recent years, an antique look has become popular in the style of buildings not only in Japan but also in western countries, and this trend is ever-increasing. To meet this demand, various devices have been developed. Among others, the ceramic industry attempts to satisfy this requirement by producing an antique tile. However, the product itself is essentially a brand-new product and only bears an antique pattern or feel. Thus, it fails to provide a really antique appearance. Moreover, its color and shape are uniform and lacks a really attractive appearance.

OBJECTS AND BRIEF SUMMARY OF THE INVENTION

Each tile in accordance with the present invention bears on its surface its own peculiar antiquated colors and color tones. The present invention provides a tile for construction which is rich in attractive patterns in an extremely natural manner, and makes it possible to obtain the tiles as a building material for a structure having an extremely warm feel by combining these tiles. In other words, since the tiles for construction in accordance with the present invention represent really antique patterns which are rich in attractive appearance and unparalleled by conventional tiles, the combination of these tiles enables the display of arts and crafts on a structure or at a part of the structure and satisfies the preference of the user for an antique look.

The refractory bricks as the material of the tile used for construction according to the present invention are those which form the lining of a high temperature heating furnace at the portions exposed to the highest heat therein and are discarded as a waste. Conventionally, these bricks have been discarded at large expense with the necessity of using large disposal spaces the industries have difficulties concerning the disposal of these waste bricks.

The present invention provides a tile for construction representing the antique patterns inherent to the refractory bricks by making use of these wastes.

DISCLOSURE OF THE INVENTION

The present invention provides a tile for construction displaying antique patterns which is obtained from refractory brick as an industrial waste. In accordance with the invention refractive bricks bearing a light Chinese ink color dyed out on the madder red surface of the bricks, that line the position exposed to the highest heat of a high temperature heating furnace which uses heavy oil or coke as its fuel and that have been replaced and discarded as waste, are cut in a suitable thickness and width using a diamond tool so as to obtain patterns having attractive antique colors on the surface. By light Chinese ink color is meant the antique effect brought about by the exposure to the highest heat in the furnace.

As described above, the tile for construction representing the antique patterns in accordance with the present invention makes it possible to display patterns having antique colors on a construction or on a portion thereof by the combination of these tiles. Depending upon the nature of the tiles, those having a rough cut surface may be utilized for a bath room floor or on a slope, in order to provide a very effective slip-resistant surface. Thus, the present invention enables the utilization of the industrial waste as a tile for construction which is otherwise extremely useless.

What is claimed is:

1. A method of producing construction tiles having an antique color appearance comprising the steps of:
    (1) removing refractory bricks used to line a high temperature furnace fueled by oil or coke and exposed to the highest temperature in said furnace, the removed refractory bricks having an antique color appearance on the exposed surfaces thereof and ordinarily discarded as waste; and
    (2) cutting the removed refractory bricks to produce tiles having antique colored surfaces.

2. A method as in claim 1, wherein said used refractory bricks have a madder red color and have a light Chinese ink color dyed out on said exposed surface.

3. A construction tile made by the process of claim 1.

4. A tile as in claim 3 wherein said refractory brick has a madder red color, said exposed surface having a light Chinese ink color dyed out thereon.

* * * * *